UNITED STATES PATENT OFFICE.

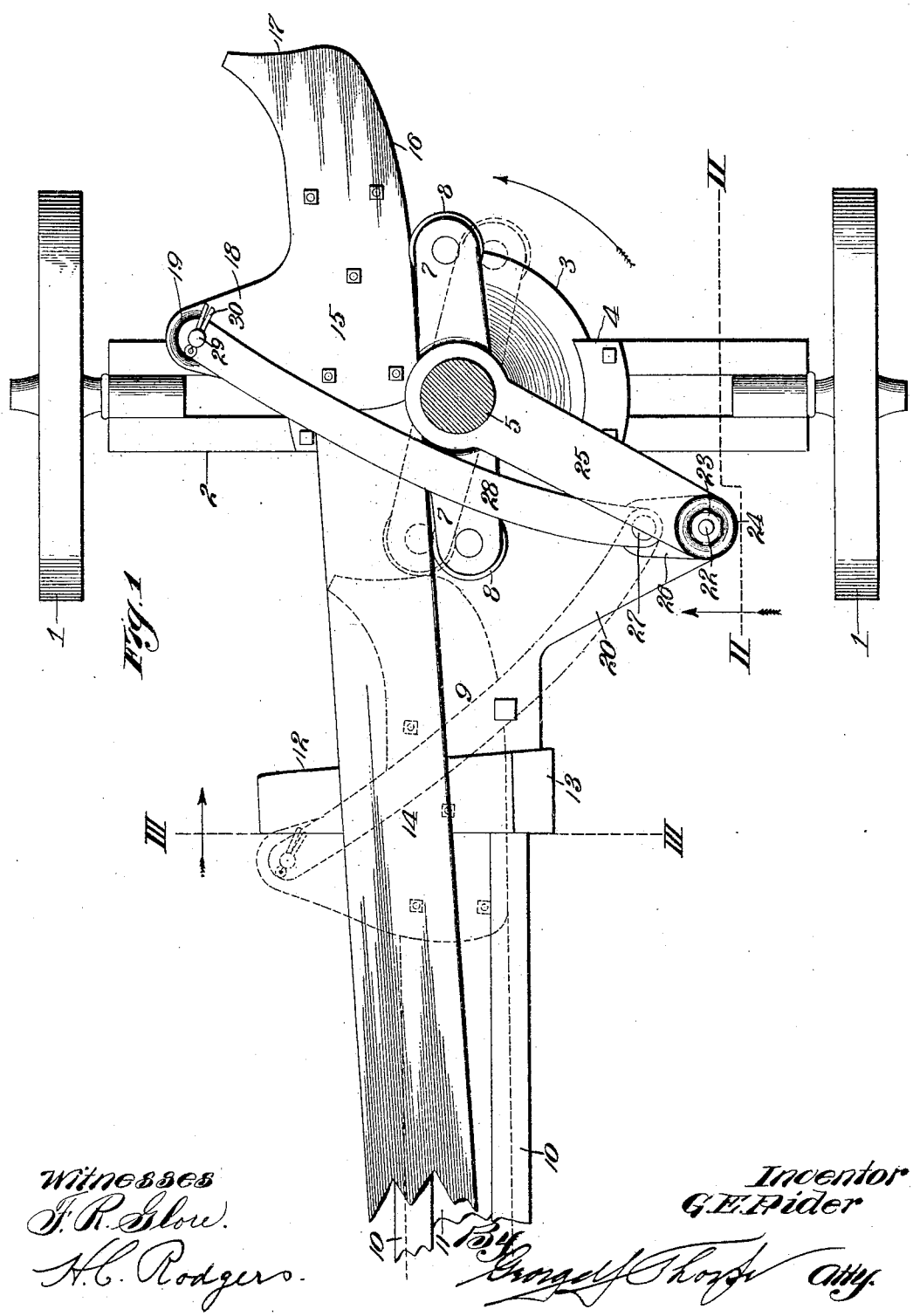

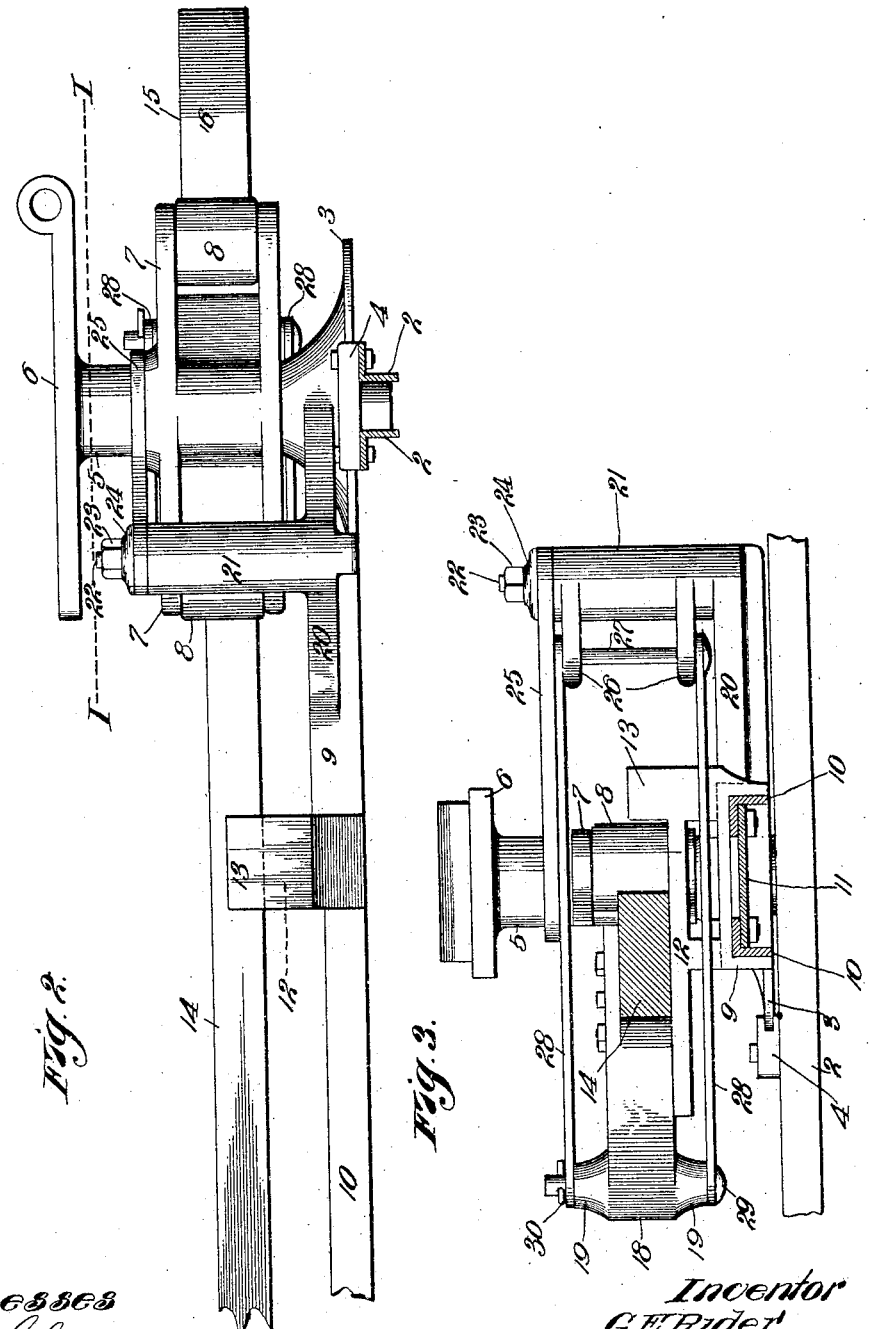

GEORGE E. RIDER, OF KANSAS CITY, MISSOURI, ASSIGNOR TO A. P. MARTY, OF KANSAS CITY, MISSOURI.

BALING-PRESS.

No. 803,626.      Specification of Letters Patent.      Patented Nov. 7, 1905.

Application filed August 12, 1904. Serial No. 220,498.

*To all whom it may concern:*

Be it known that I, GEORGE E. RIDER, a citizen of the United States, residing at Kansas City, in the county of Jackson and State of Missouri, have invented certain new and useful Improvements in Baling-Presses, of which the following is a specification.

This invention relates to baling-presses, and has for its object to produce a simple, strong, durable, and cheap press which shall perform its function efficiently and reliably.

With this object in view the invention consists in certain novel and peculiar features of construction and combinations of parts, as hereinafter described and claimed, and in order that it may be fully understood reference is to be had to the accompanying drawings, in which—

Figure 1 is a horizontal section taken on the line II of Fig. 2. Fig. 2 is a section on the line II II of Fig. 2. Fig. 3 is a section on the line III III of Fig. 1.

In the said drawings, where like reference-numerals refer to corresponding parts in all the figures, 1 designates the front wheels, suitably journaled upon the front axle, the same preferably comprising a pair of parallel angle-plates 2.

3 designates a circular base-plate secured centrally above the axle by the guide-blocks 4, bolted to the latter.

5 designates the power-shaft, journaled on the base-plate 3 in any suitable manner, and 6 the sweep-head at the upper end of the shaft. The power-shaft is provided, as usual, with the oppositely-projecting trip-arms 7, equipped with antifriction-rollers 8, all of the parts thus far described being of well-known construction and arrangement.

The base-plate is provided with an extension 9, projecting toward the baling-case (not shown) and channeled at its under side to receive the reach, consisting, by preference, of angle-irons 10, connected by bridge-plate 11. The extension 9 is provided with an upwardly-projecting and preferably skeleton portion 12, terminating at one side of the reach in an upwardly-projecting trip-off lug 13, the portion 12 serving as a support for the customary plunger-beam 14. The plunger-beam is provided with a metallic head 15, having its inner side beveled, as at 16, to its front end and leading to the usual pocket 17 at such end, and projecting outward from said head at a suitable distance rearward of the pocket is a lug 18, having the vertical bosses 19 projecting from its upper and lower sides. At the opposite side of the power-shaft and projecting from the base-plate and its extension is an arm 20, having an upwardly-projecting boss 21, terminating above the plane of the trip-arms in a threaded stem 22, engaged by a nut 23 and washer 24, and engaging said stem and clamped between the washer and the top of boss 21 is one end of a brace 25, mounted at its opposite end on the power-shaft and resting upon the trip-lever, as shown most clearly in Fig. 2. The boss 21 is provided, by preference, with inwardly-projecting arms 26, connected by pivot-bolt 27, the upper and lower ends of said pivot-bolt being pivotally connected by links 28 to the pivot-bolt 29, extending through the lug 18 and its bosses 19 of the plunger-beam head, said bolt being held in place by a linchpin 30 or its equivalent.

When at rest, the parts are in the position shown in Fig. 1, so that the revolution of the power-shaft in the direction indicated by the arrow on said figure shall cause the roller of the inwardly-projecting trip-arm to press against the plunger-beam head, and thus push the same away from the shaft, this action resulting in a rapid rearward movement of the beam and a slight lateral movement, because the guide-links 28 permit of but a slight lateral movement away from the shaft, as will be readily seen. The proportions of the parts are such that when the trip lever-arms extend substantially at right angles to the position shown said roller has entered the pocket of the plunger-beam and the latter has made approximately two-thirds of its stroke and has condensed the charge of hay in the baling-case. The sweep movement continuing, the remainder of the stroke of the plunger-beam is slow, because induced wholly by the pressure of said trip-arm roller against the end of the beam, such trip-arm roller obviously traveling across the end of the beam, so that by the time the lateral movement of the beam is ended by contact with the trip-off lug 13 its longitudinal movement is also ended and said roller passes from engagement with its head, this action being instantly followed by the recoil of the plunger-beam, as is customary in this type of press, and immediately such recoil ends the roller of the other trip-arm, which is now projecting forwardly, comes into contact with the beveled side of the head 15 and starts the second compression-stroke, this second and all succeeding strokes being followed by the recoil of the beam.

The proportions of the parts are such that the compression-stroke is about the same as in the standard two-stroke presses now on the market, and it is to be understood, of course, that, while I have illustrated and described the preferred embodiment of the invention, it is susceptible of modification in minor particulars without departing from its spirit and scope or sacrificing any of its advantages.

Having thus described the invention, what I claim as new, and desire to secure by Letters Patent, is—

1. A baling-press, comprising a base-plate having a laterally-projecting lug, an upright power-shaft suitably journaled and provided with a trip lever-arm, a brace mounted on the shaft and substantially parallel and rigidly connected to the outer end of said lug, a reciprocatory plunger-beam adapted to project forward beyond the power-shaft at the side of the same opposite from said lug, a head for said plunger-beam having a lug projecting outwardly therefrom, a link between the trip lever-arm and the brace, and a similar link below the trip lever-arm; said links being pivotally connected at their opposite ends to the lug on the plunger-beam and the rigid connection between the power-shaft and the lug of the base-plate.

2. A baling-press, comprising a base-plate having a rearwardly-projecting extension and a laterally-projecting lug provided with an upwardly-projecting boss, a plunger-beam support having an upwardly-projecting trip-off lug, a power-shaft suitably journaled and provided with a trip lever-arm for horizontal movement, a plunger-beam resting on said plunger-beam support and adapted to project forwardly beyond the power-shaft at the side of the latter opposite from said boss, a head for said plunger-beam having a lug projecting laterally therefrom, and links pivotally connecting said boss and plunger-beam-head lug above and below the trip lever-arm.

In testimony whereof I affix my signature in the presence of two witnesses.

GEORGE E. RIDER.

Witnesses:
   A. M. STRAIGHT,
   G. Y. THORPE.